United States Patent
Breheney

(10) Patent No.: US 9,638,939 B1
(45) Date of Patent: May 2, 2017

(54) REMOVABLE LAYER COVERING EYEWEAR AND METHOD THEREOF

(71) Applicant: Scratchy's LLC, Tampa, FL (US)

(72) Inventor: Ryan R. Breheney, Tampa, FL (US)

(73) Assignee: Scratchy's LLC, Tampa, FL (US)

(*) Notice: Subject to any disclaimer, the term of this patent is extended or adjusted under 35 U.S.C. 154(b) by 0 days.

(21) Appl. No.: 14/865,614

(22) Filed: Sep. 25, 2015

Related U.S. Application Data

(60) Provisional application No. 62/055,935, filed on Sep. 26, 2014.

(51) Int. Cl.
  *G02C 11/02* (2006.01)
  *G02C 5/14* (2006.01)
  *G02C 5/00* (2006.01)
  *G02C 5/22* (2006.01)

(52) U.S. Cl.
  CPC ............ *G02C 11/02* (2013.01); *G02C 5/008* (2013.01); *G02C 5/146* (2013.01); *G02C 5/22* (2013.01); *G02C 2200/08* (2013.01); *G02C 2200/14* (2013.01); *G02C 2200/16* (2013.01)

(58) Field of Classification Search
  CPC ................................. G02C 11/02; G02C 7/105
  USPC ............... 351/51, 52, 111, 121, 41; 264/279
  See application file for complete search history.

(56) References Cited

U.S. PATENT DOCUMENTS

| | | | |
|---|---|---|---|
| 2,789,381 A * | 4/1957 | Belgard | G02C 5/00 351/51 |
| 2,842,028 A | 7/1958 | Belgard | |
| 4,560,258 A | 12/1985 | Stanley | |
| 7,467,866 B2 | 12/2008 | Chao | |
| 8,622,540 B2 | 1/2014 | Burnstein | |
| 8,828,296 B2 * | 9/2014 | Zhang | B29C 45/1671 264/279 |
| 2009/0174860 A1 | 7/2009 | Lam | |
| 2010/0265453 A1 | 10/2010 | Lampru | |
| 2010/0315586 A1 | 12/2010 | Mansuy | |
| 2012/0013841 A1 * | 1/2012 | Montsaroff | B44C 1/00 351/51 |
| 2012/0113381 A1 | 5/2012 | Jacquier | |
| 2012/0327358 A1 | 12/2012 | Iaria | |
| 2013/0128216 A1 | 5/2013 | Filutowski | |

* cited by examiner

*Primary Examiner* — Hung Dang
(74) *Attorney, Agent, or Firm* — Frijouf, Rust & Pyle, P.A.

(57) ABSTRACT

A removable layer is disclosed for covering an eyewear. The eyewear has an eyewear pigment. The removable layer comprises a scratch off layer covering the eyewear. The scratch off layer has a layer pigment. The scratch off layer is selectively removed from the eyewear for defining a visual image with the eyewear pigment relative to the layer pigment.

24 Claims, 10 Drawing Sheets

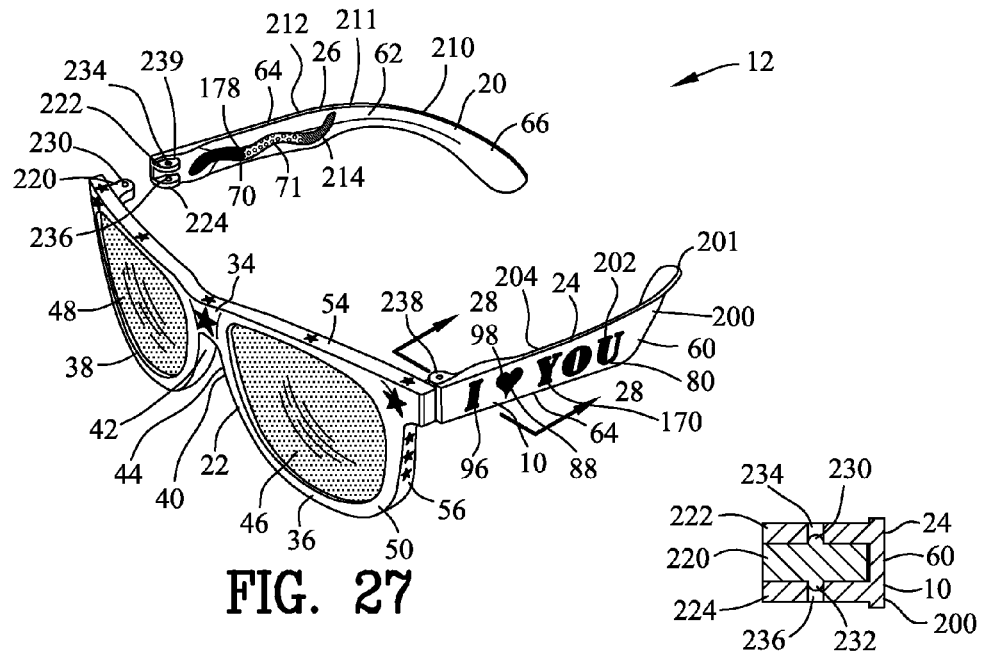
FIG. 27
FIG. 28
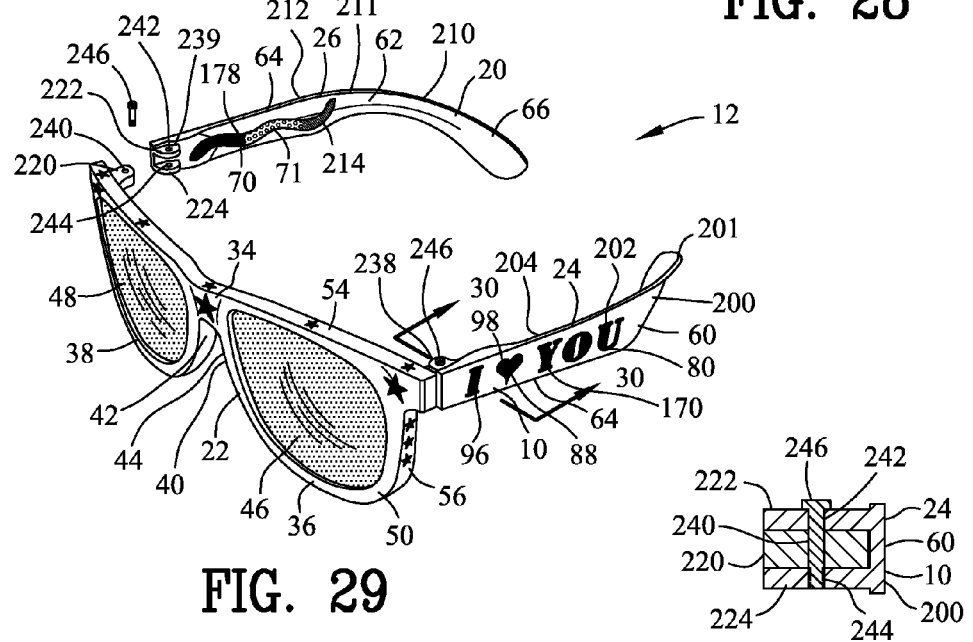
FIG. 29
FIG. 30

REMOVABLE LAYER COVERING EYEWEAR AND METHOD THEREOF

CROSS-REFERENCE TO RELATED APPLICATIONS

This application claims benefit of U.S. Patent Provisional Application No. 62/055,935 filed Sep. 26, 2014. All subject matter set forth in Provisional Application No. 62/055,935 is hereby incorporated by reference into the present application as if fully set forth herein.

BACKGROUND OF THE INVENTION

Field of the Invention

This invention relates to eyewear and more particularly to an improved eyewear with a decorative feature.

Background of the Invention

The origination of eyeglasses is purported to have originated in Arabia during the 11th century. Through the ages various developments improved eyeglasses. In the 1600s lenses fixed to a rigid bridge enabled the lenses to be more easily held in place. Between 1725 and 1750 an optician designed the first temple spectacles we use today.

During the 20th century several dramatic changes in eyewear occurred. As progress in lens material and corresponding acuity transpired, simultaneously frame shapes became more stylish and became a popular accessory whether or not worn with prescription strength lenses. Since a person's eyes are a focal point of their unique appearance, frame style, shape and decoration have become significant factors in the statement of their image. Unique frame styles and decorations have been available at high cost on a custom made basis. There have been many attempts to provide various methods of custom, unique, frame decorations for eyeglasses, but since they have been based on production line processes, truly unique frames have been unavailable to the general public.

There have been many in the prior art who have attempted to solve these problems with varying degrees of success. None, however completely satisfies the requirements for a complete solution to the aforestated problem. The following U. S. Patents are attempts of the prior art to solve this problem.

U.S. Pat. No. 2,842,028 to Belgard discloses a means for forming inlays of various types within a plastic frame. A further object is to provide a structure in which inlays of various colors and contrasting designs may be applied upon a plastic glasses frame while the same is upon the wearer to determine the desired effect. The inlays are readily secured in permanent position after the selection of the appropriate inlays. Yet another object is to provide means whereby inlays may be effectively secured within the formed cavity without overflow of cement while preventing the cement from presenting an unsightly appearance. A still further object is to provide means for securing inlays for strengthening or decorative purposes at selected points upon the eyeglass frame, including the temple thereof, and in combination with the frame or temple structures. Other specific objects and advantages will appear as the specification proceeds.

U.S. Pat. No. 4,560,258 to Stanley, et al. discloses a pair of spectacles, preferably in the form of a card bearing advertising, decorative or promotional material. The spectacles have a channel formed in the frame and receive a pair of temples which can be retracted and swung into a position in which they lie transverse to the frame to bring them into the position of use.

U.S. Pat. No. 7,467,866 to Chao discloses a decorative label attached to spectacles including a pair of wide frames connected by a bridge, a pair of lenses respectively disposed into the frames and a pair of wide temples respectively hinged with the outer periphery of the frames by a pair of screws. The temples each have a dovetail groove in an outer surface abutting front end thereof for slidably engaging with a pair of dovetail decorative labels respectively. The decorative label is varied in form and versatile in style in order to attract people.

U.S. Pat. No. 8,622,540 to Burnstein discloses an eyeglass frame member which can be individualized and/or accessorized according to user's moods or desires, or according to display indicia displayed in the frames or new temples of different shapes or colors. Decorative or personalized pin members can be positioned in openings in the display frames or temple members. Mating connecting members can be used to selectively disconnect and change the temple members relative to the frame member.

United States Patent Application 2009/0174860 to Lam, et al. discloses an eyeglass frame including a thermoplastic sheet laminate incorporating transfer printing eyeglass decorative patterns and a one or more covering layers bonded thereto. A process for manufacturing an eyeglass frame includes: preparing a thermoplastic sheet laminate incorporating eyeglass decorative patterns; bending the thermoplastic sheet laminate under heat and pressure forming a one or more intermediate products in a first mold; and bonding a one or more covering layers to the intermediate products from the bending step in a second mold.

United States Patent Application 2010/0265453 to Lampru discloses an eyeglass temple works with an interchangeable eyeglass temple cover to change the appearance of the eyeglasses. A clip on the eyeglass temple is used to secure the cover to the eyeglass temple. The temple cover can be made of silicone and include a hole to make inserting and removing the temple cover easier.

United States Patent Application 2010/0315586 to Mansuy discloses eyeglasses having temples with detachable decorative pieces. The decorative pieces generally comprise an inner piece and outer piece which connect to one another through and/or around the eyeglass temples. When attached together, the outer decorative piece and the inner decorative piece are supported by and attached to the eyeglass temples.

United States Patent Application 2012/0113381 to Jacquier, et al. discloses an arm for spectacles including a frame, characterized in that it comprises at least one decorative sleeve at least partially made of an elastically deformable material, provided with at least one decorative surface and mounted around the frame of the arm. The sleeve is designed to turn and/or twist around the frame by means of elastic deformation in order to modify the appearance of the arm. The invention also relates to the spectacles provided with such an arm. The present invention can be used in the field of spectacles United States Patent Application 2012/0327358 to Iaria discloses an embodiment of eyewear frames having a predetermined sequence of discrete material sections that are differentiable, e.g. visually differentiable. Placement of the discrete material sections may be by molding or casting, or by applying the material onto a substrate of the frame.

United States Patent Application 2013/0128216 to Filutowski, et al. discloses eyeglasses which may include a frame body and at least one lens carried by the frame body, and at least one display carried on at least one exterior surface of the frame body and configured to display a changeable image thereon. The at least one display may be conformal to the at least one exterior surface. The eyeglasses may further include a communications interface carried by the frame body, and a controller carried by the frame body and coupled to the at least one display and the communications interface. The controller may be configured to receive display data via the communications interface, and selectively change the image on the at least one display based upon the received display data to thereby change an external visual appearance of the frame body.

Although the aforementioned prior art have contributed to the development of the art of decorative eyeglasses none of these prior art patents have solved the needs of this art.

Therefore, it is an object of the present invention to provide an improved decorative eyeglass frame.

Another object of this invention is to provide an improved eyeglass frame which is easily uniquely decorated by the user.

Another object of this invention is to provide an improved eyeglass frame that is simple for the user to custom decorate.

Another object of this invention is to provide an improved eyeglass frame that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved method and apparatus of a removable layer covering an eyewear. The eyewear having a frame, a primary temple arm and a secondary temple arm. The frame has a front side, a rear side, an upper side and a lower side. The primary temple arm and the secondary temple arm have an exterior side and an interior side. The eyewear has an eyewear pigment. The removable layer comprises a scratch off layer covering the eyewear. The scratch off layer has a layer pigment. The scratch off layer is selectively removed from the eyewear for defining a visual image with the eyewear pigment relative to said layer pigment.

In a more specific embodiment of the invention, the visual image includes a letter, number, design, symbol, message or combination thereof.

In one embodiment of the invention, the scratch off layer covers the exterior side of the primary temple arm and the visual image is positioned on the exterior side of the primary temple arm.

In another embodiment of the invention, the scratch off layer covers the exterior side of the secondary temple arm and the visual image is positioned on the exterior side of the secondary temple arm.

In another embodiment of the invention, a protective layer covers the visual image for protecting the scratch off layer from additional inadvertent removal of the scratch off layer from the eyewear.

The invention is also incorporated into the method of coating an eyewear with a scratch off layer. The selected portion of the scratch off layer is removed for defining a visual image with an eyewear pigment of the eyewear relative to a layer pigment of the scratch off layer.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 27 is a view similar to FIG. 1 illustrating a first disengaging pivot separating the primary temple arm from the frame and a second disengaging pivot separating the secondary temple arm from the frame;

FIG. 28 is a sectional view along line 28-28 in FIG. 27;

FIG. 29 is a view similar to FIG. 27 illustrating a first disengaging pivot separating the primary temple arm from the frame and a second disengaging pivot separating the secondary temple arm from the frame; and FIG. 30 is a sectional view along line 30-30 in FIG. 29.

Similar reference characters refer to similar parts throughout the several Figures of the drawings.

DETAILED DISCUSSION

Figure 1:
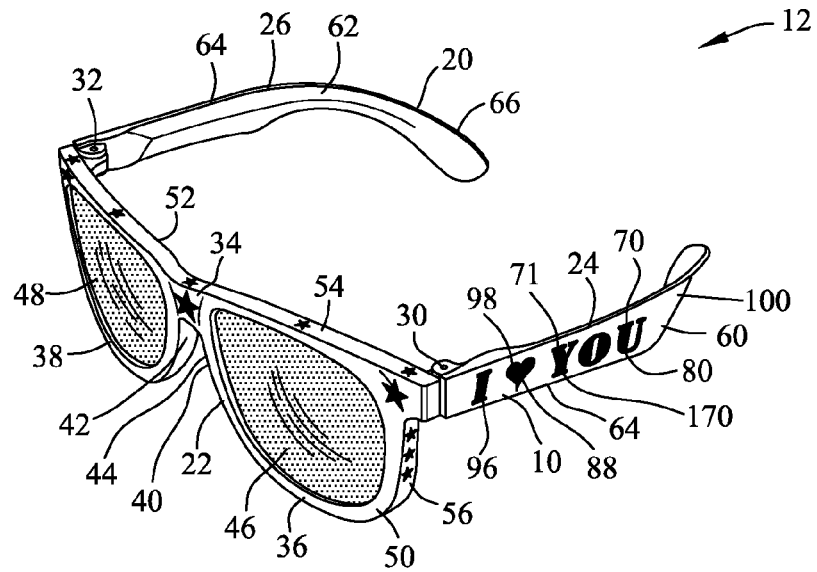
FIG. 1 is a front right isometric view of an eyewear with a decorative feature.
Figure 2:
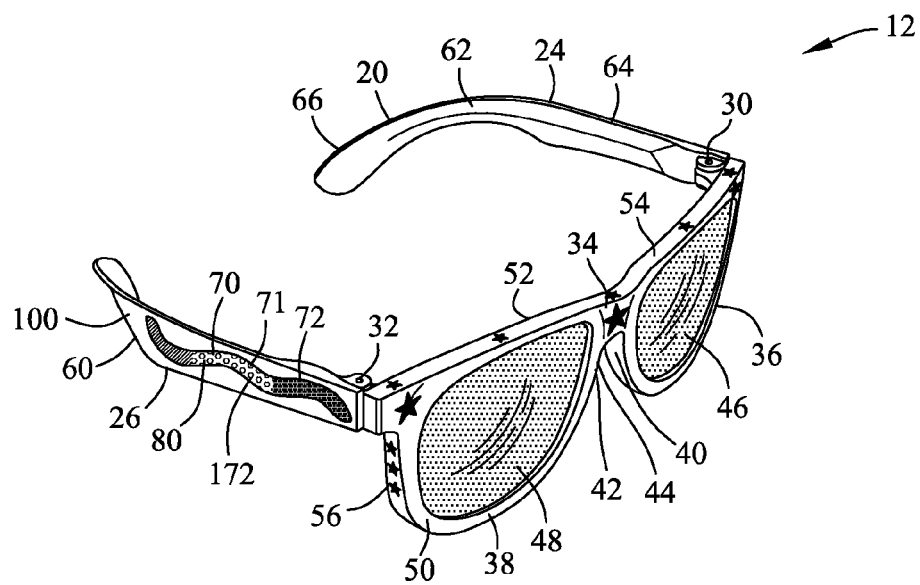
FIG. 2 is a front left isometric view of FIG. 1.
Figure 6:
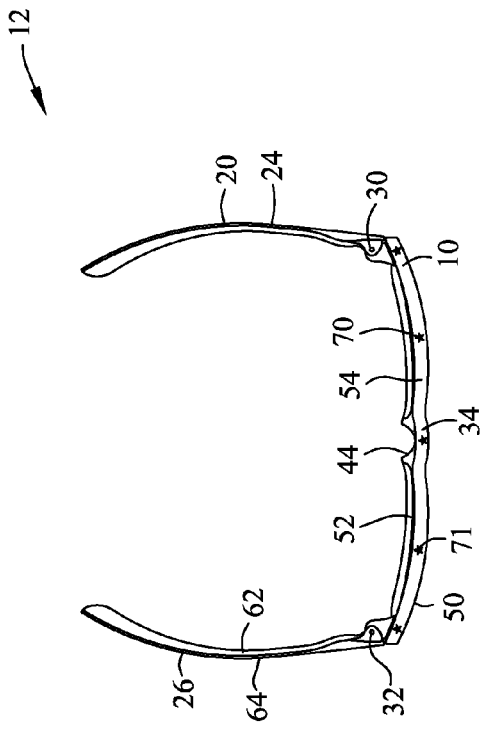
FIG. 6 is a top view of FIG. 3.
Figure 5:
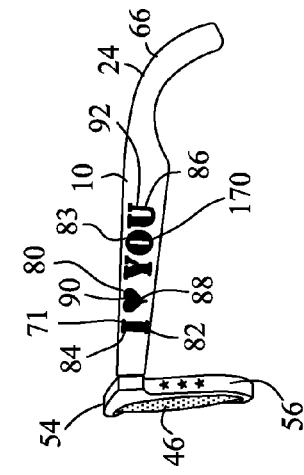
FIG. 5 is a right side view of FIG. 3.
Figure 3:
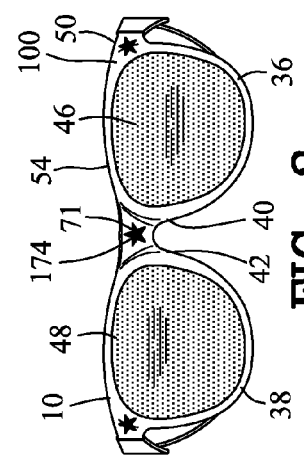
FIG. 3 is a front view of FIG. 1.
Figure 4:
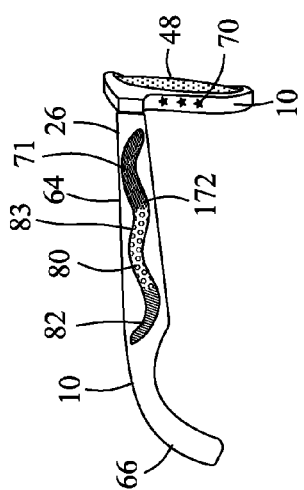
FIG. 4 is a left side view of FIG. 3.

FIGS. 1-14, 16 and 17 illustrate a removable layer 10 covering an eyewear 20 for creating an eyewear 20 with a decorative feature 12. The eyewear 20 has a frame 22, a primary temple arm 24 and a secondary temple arm 26. The frame 22 has a front side 50, a rear side 52, an upper side 54 and a lower side 56. The primary temple arm 24 and the secondary temple arm 26 have an exterior side 60 and an interior side 62. Both the primary temple arm 24 and the secondary temple arm 26 may have a linear portion 64 and an arcuate potion 66.

A first hinge 30 pivotally couples the primary temple arm 24 with the frame 22. A second hinge 32 pivotally couples in the secondary temple arm 26 with the frame 22. The frame 22 includes a primary frame portion 36 and a secondary frame portion 38 coupled by a bridge 34. The eyewear 20 may further include nose pads 44 couple to the primary frame portion 36 and the secondary frame portion 38 by a primary pad arm 40 and a secondary pad arm 42 respectively. The primary frame portion 36 and the secondary frame portion 38 preferably containing a primary lens 46 and a secondary lens 48 respectively. The primary lens 46 and the secondary lens 48 may include a prescription lens, a safety lens, a UVA/UVB lens or the combination thereof.

The eyewear 20 includes an eyewear decorative surface 71. The decorative surface 71 may include an eyewear pigment 70, a pattern 72, a texture 74, a first pigment 76 and a second pigment 78, multiple pigments 75 and/or a hologram 79. By way of example, the pattern 72 may include a checkered pattern, a rainbow pattern, striped pattern or other pattern designs. By way of example, the texture 74 may include a rough, sandy, grainy, smooth, semi-smooth, gritty, bumpy or other textures.

The removable layer 10 includes a scratch off layer 100 covering the entire eyewear 20 or individual components of the eyewear 20 namely the frame 22, primary temple arm 24, secondary temple arm 26, primary lens 46 and secondary lens 48. The scratch off layer 100 may include an opaque latex substance 102 for permitting the selective removal of the scratch off layer 100 and resisting the removal of the scratch off layer 100 from normal abrasion. Alternatively, the scratch off layer 100 may be constructed from other substances which can be easily scratched off, dissolved off or be heat treated in order to expose the underlayment.

The scratch off layer 100 has a scratch off decorative surface 106. The scratch off decorative surface 106 may include a layer pigment 104, pattern 110, texture 112, a first pigment 114 and a second pigment 116, multiple pigments 113 and/or a hologram 119. By way of example, the pattern 110 may include a checkered pattern, a rainbow pattern, striped pattern or other pattern designs. By way of example, the texture 112 may include a rough, sandy, grainy, smooth, semi-smooth, gritty, bumpy or other textures.

As shown in FIGS. 1-5, 9-14, 16 and 17, the scratch off layer 100 is selectively removed from the eyewear 20 for defining a visual image 80 with the eyewear pigment 70 relative to the layer pigment 104. More specifically, the visual image 80 includes a visual image outlined 96 and a visual image interior design 98. As such, the decorative feature 12 of the eyewear 20 can be utilized by an individual for customizing their eyewear 20 to be configured into a personable decorative appearance. More specifically, the visual image 80 may include a letter 84, number 86, design 88, symbol 90, message 92 or combination thereof.

The visual image 80 maybe constructed from a scratch off tool 120. The scratch off tool 120 may have a fine head 122 for removing small areas of the scratch off layer 100 and creating detailed images. Alternatively, the scratch off tool 120 may include a broad head 124 for removing large areas of the scratch off layer 100. The scratch off tool 120 may include other scratching devices such as a coin or other objects.

FIGS. 1, 5, 9, 13, 16 and 17, illustrate the scratch off layer 100 covering the exterior side 60 of the primary temple arm 24. The scratch off tool 120 may be utilized on the exterior side 60 of the primary temple arm 24 for producing the visual image 80. FIGS. 2, 4, 10, 11, 12 and 14, illustrate the scratch off layer 100 covering the exterior side 60 of the secondary temple arm 26. The scratch off tool 120 may be utilized on the exterior side 60 of the secondary temple arm 26 for producing the visual image 80.

Figure 13:
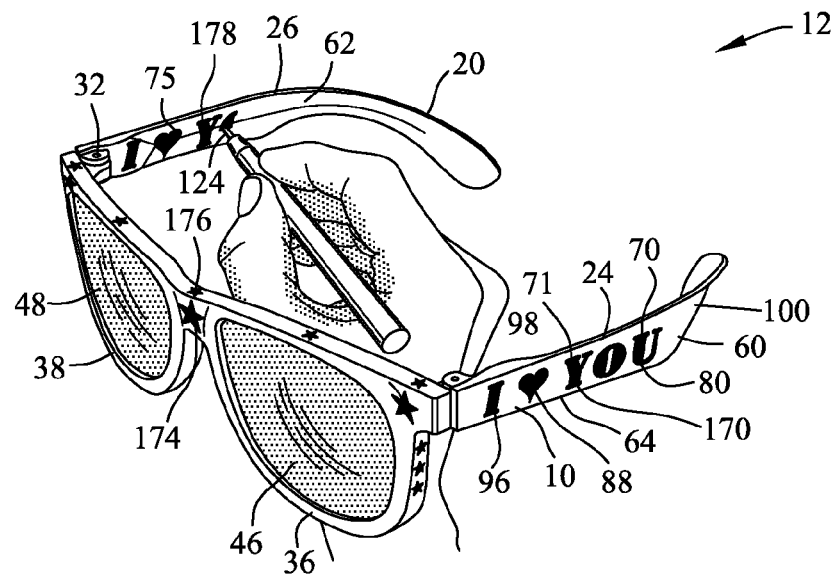
FIG. 13 is a view similar to FIG. 9 illustrating the removable layer being removed from the eyewear for creating a visual image on an interior side of the secondary temple arm.
Figure 14:
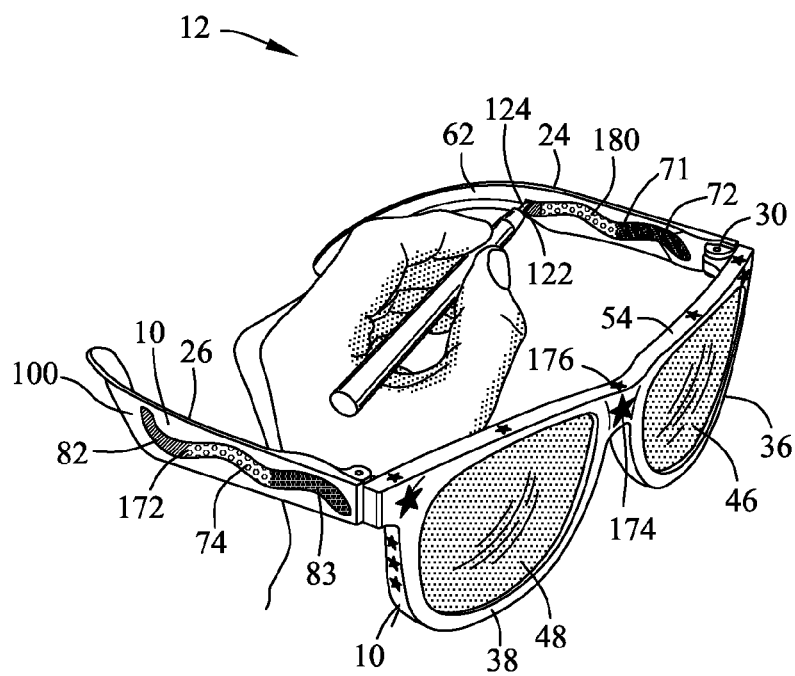
FIG. 14 is a view similar to FIG. 10 illustrating the removable layer being removed from the eyewear for creating a visual image on an interior side of the primary temple arm.

FIG. 14 illustrates the scratch off layer 100 covering the interior side 62 of the primary temple arm 24. The scratch off tool 120 may be utilized on the interior side 62 of the primary temple arm 24 for producing the visual image 80. FIG. 13 illustrates the scratch off layer 100 covering the interior side 62 of the secondary temple arm 26. The scratch off tool 120 may be utilized on the interior side 62 of the secondary temple arm 26 for producing the visual image 80.

FIGS. 1, 2, 3 and 11-14, illustrate the scratch off layer 100 covering the front side 50 of the frame 22. The scratch off tool 120 may be utilized on the front side 50 of the frame 22 for producing the visual image 80. In summary, all or portions of the frame 22 and/or the primary lens 46 and secondary lens 48 may be covered in the scratch off layer 100. As such, the entire frame 22 and/or the primary lens 46 and secondary lens 48 may contain the visual image 80.

As shown in FIGS. 2, 4 and 10-14, the combination of the layer pigment 104 and the pattern 42, texture 74, the first pigment 76 and the second pigment 78, multiple pigments 75 and/or a hologram 79 of the eyewear 20 results in a second visual image 82 or compound visual image 83. The eyewear 20 may be manufactured with various combinations of layer pigment 104 and eyewear pigment 70 for permitting the user to further customize their eyewear 20.

As shown in FIGS. 15-18, after the visual image 80 has been completed a protective layer 140 may encircle the portion of the eyewear 20 that contains the visual image 80. More specifically, the protective layer 140 protects the scratch off layer 100 from additional inadvertent removal of the scratch off layer 100 from the eyewear 20. The protective layer 140 includes a transparent material 142 for permitting the viewing of the visual image 80. The protective layer 140 includes an exterior side 144 and an interior side 146. An adhesive layer 148 is coupled to the interior side 146 of the protective layer 140. The adhesive layer 148 is utilized for coupling the protective layer 140 to the eyewear 20. Prior to the adhesive layer 148 engaging with the eyewear 20, an adhesive cover sheet 150 may be utilized to contact and protect the adhesive layer 148.

Figure 16:
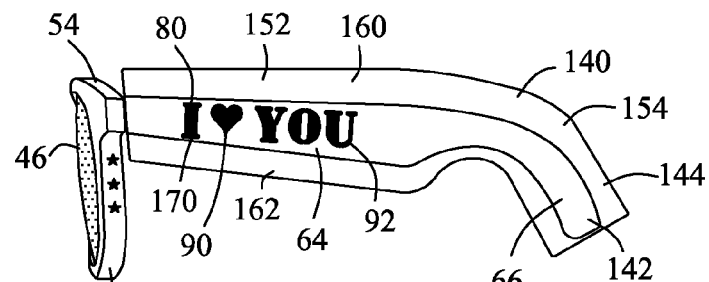
FIG. 16 is a view similar to FIGS. 5 and 15 illustrating the transparent protective layer being positioned over the visual image.

Preferably, the shape of the protective layer 140 should be adapted for encircling the eyewear 20. More specifically, the protective layer 140 may include a linear protective portion 152 and an arcuate protective portion 154. As shown in FIG. 16, the protective layer 140 has been partially adhered to the exterior side 60 of the primary temple arm 24. The protective layer 140 includes an upper overhang portion 160 and a lower overhang portion 162. The upper overhang portion 160 and the lower overhang portion 162 serve to protect any additional visual image 80 that may be located on the interior side 62 of the primary temple arm 24. More specifically, the overhang portion 160 and a lower overhang portion 162 encircle the primary temple arm 24.

Figure 19:
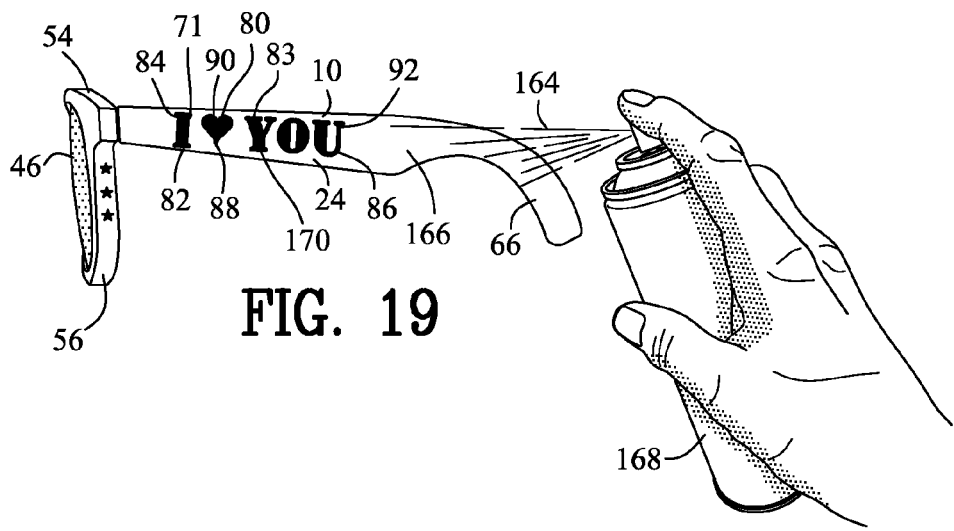
FIG. 19 is a view similar to FIG. 5 illustrating a clear coat spray dispensed from an aerosol can for protecting the scratch off layer.
Figure 20:
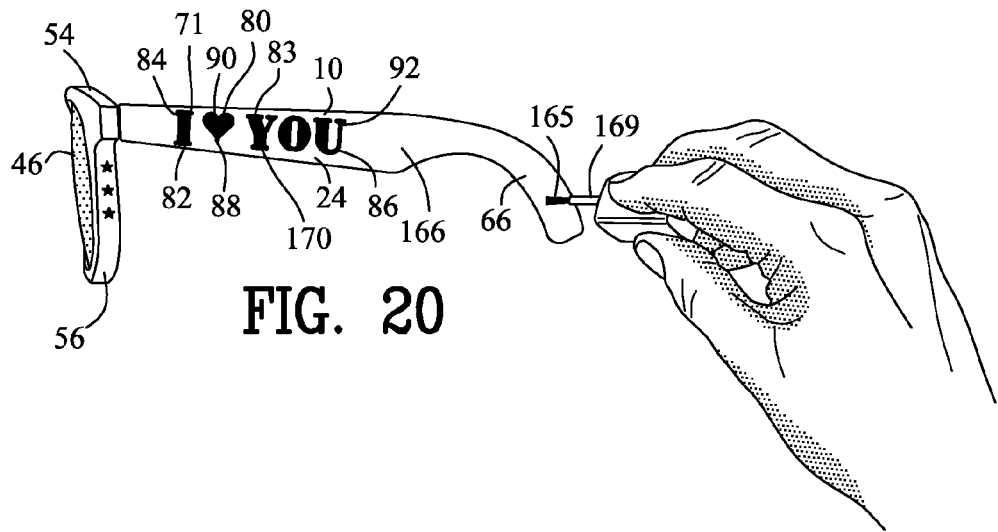
FIG. 20 is a view similar to FIG. 19 illustrating a nail polish liquid dispensed from a nail polish applicator for protecting the scratch off layer.
Figure 21:
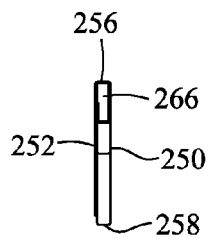
FIG. 21 front view of a removable encapsulating shield.
Figure 22:
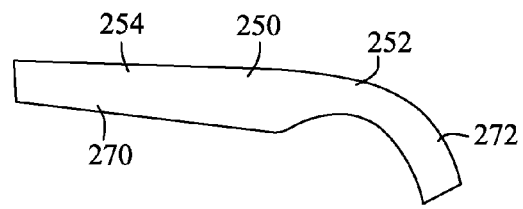
FIG. 22 is a right side view of FIG. 21.

As shown in FIGS. 19 and 20 the protective layer 140 may further could include a clear coat spray 164 that is dispensed from an aerosol can 168. Upon curing of the clear coat spray 164, the clear coat spray 164 becomes a hardened layer 166 that protects the scratch off layer 100 from additional inadvertent removal of the scratch off layer 100 from the eyewear 20. Alternatively, the protective layer 140 could include a nail polish liquid 165 dispensed from a nail polish applicator 169. Upon curing of the nail polish liquid 165, the nail polish liquid 165 becomes a hardened layer 166 that protects the scratch off layer 100 from additional inadvertent removal of the scratch off layer 100 from the eyewear 20.

FIGS. 21-26 illustrate the protective layer 140 including a removable encapsulating shield 250. The removable encapsulating shield 250 is a semi rigid transparent polymeric material defining a transparent shield 252 that may be positioned around the primary temple arm 24 and the secondary temple arm 26 for protecting the scratch off layer 100 from additional inadvertent removal of the scratch off layer 100 from the eyewear 20. The removable encapsulating shield 250 includes an exterior shield side 254, and upper shield side 256, a lower shield side 258, a primary interior shield side 260 and a secondary interior shield side 262 for defining a shield channel 266.

Figure 23:
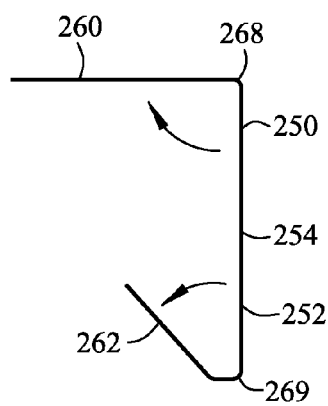
FIG. 23 is an enlarged view of FIG. 21 illustrating a primary interior shield side and a secondary interior shield being pivoted relative to an exterior shield side.
Figure 24:
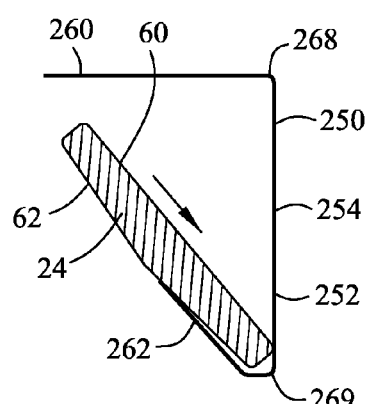
FIG. 24 is a view similar to FIG. 23 illustrating the primary temple arm or the secondary temple arm positioned within the removable encapsulating shield.
Figure 25:
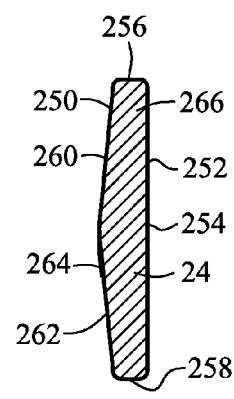
FIG. 25 is a view similar to FIG. 24 illustrating the primary interior shield side and the secondary interior shield side abutment against the primary temple arm or the secondary temple arm.
Figure 26:
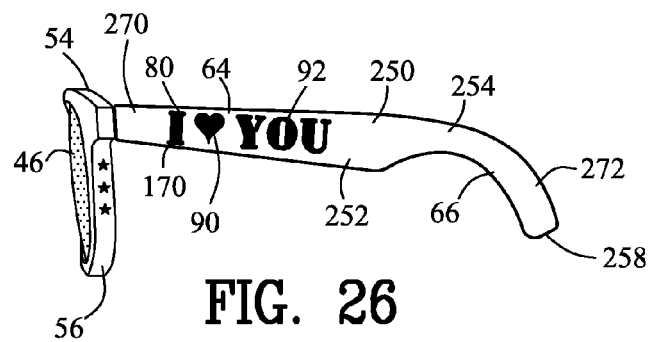
FIG. 26 is a view similar to FIG. 5 illustrating the removable encapsulating shield encapsulating the primary temple arm.

The removable encapsulating shield 250 includes a shield linear portion 270 and a shield arcuate portion 272 to be slightly larger than the linear portion 64 and the arcuate portion 66 respectively. As shown in FIGS. 23-25, the removable encapsulating shield 250 may be positioned around in the primary temple arm 24 or the secondary temple arm 26 by first displacing the primary interior shield side 260 from the exterior shield side 254 about a first shield pivot 268 integral to the transparent shield 252. Thereafter, the secondary interior shield side 262 is displaced from the exterior shield side 254 about a second shield pivot 269 integral to the transparent sheet 252. The primary temple arm 24 or the secondary temple arm 26 is positioned adjacent to the lower shield side 258 lower side and thereafter positioned adjacent to the upper shield side 256.

The primary interior shield side 260 and the secondary interior shield side 262 are permitted to pivot to their natural state for abutment against the interior side 62 of the primary temple arm 24 or the secondary temple arm 26. The primary interior shield side 260 and the secondary interior shield side 262 to finding a shield overlap 264 for preventing any hair follicles getting entangled in the removable encapsulating shield 250.

As shown in FIGS. 27-30, the eyewear 20 may further include a first removable primary temple arm 200 and a second removable secondary temple arm 210. A first disengaging pivot 238 pivots the primary temple arm 24 relative to the frame 22. A second disengaging pivot 239 pivots the secondary temple arm 26 relative to the frame 22. More specifically, the first disengaging pivot 238 separates the primary temple arm 24 from the frame 22 and the second disengaging pivot 239 separates the secondary temple arm 26 from the frame 22. The first disengaging pivot 238 permits the engagement of an alternative primary temple arm 201 including a first altering visual image 202 and a six altering visual image 204. Similarly, the second disengaging pivot 239 permits the engagement of an alternative secondary temple arm 211 including a second altering visual image 212 and a fifth altering visual image 214.

The first disengaging pivot 238 and the second disengaging pivot 239 allows the user to easily interchange the primary temple arm 24 and the secondary temple arm 26 with the alternative primary temple arm tool one and the alternative secondary temple arm to 11, respectively. This allows the user to interchange the primary temple arm 24 and the secondary temple arm 26 with others having various other visual images 80.

As shown in FIGS. 27-30, the first disengaging pivot 238 and the second disengaging pivot 239 includes a frame barrel 220 coupled to the frame 22 and a primary arm barrel 222 and a secondary arm barrel 224 coupled to the first removable primary temple arm 200 and the second removable secondary temple arm 210.

As shown in FIGS. 27 and 28, an upper barrel nipple 230 extends above the frame barrel 220 and a lower barrel nipple 232 extends below the frame barrel 220. An upper barrel aperture or upper barrel notch 234 is defined within the primary arm barrel 222 and a lower barrel aperture or lower barrel notch 236 is defined within the secondary arm barrel 224. To engage the first removable primary temple arm 200 and the second removable secondary primary arm 210 with the frame 22, the frame barrel 220 is positioned between the primary arm barrel 222 and the secondary arm barrel 224 for positioning the upper barrel nipple 230 within the upper barrel aperture or upper barrel notch 234 and the lower barrel nipple 232 with the lower barrel aperture or lower barrel notch 236.

Alternatively, as shown in FIGS. 29 and 30, a frame barrel aperture 240 extends through the frame barrel 220. An upper barrel aperture 242 is defined within the primary arm barrel 222 and a lower barrel aperture 244 is defined within the secondary arm barrel 224. To engage the first removable primary temple arm 200 and the second removable secondary primary arm 210 with the frame 22, the frame barrel 220 is positioned between the primary arm barrel 222 and the secondary arm barrel 224 for aligning the frame barrel aperture 240 with the upper barrel aperture 242 and the lower barrel aperture 244. Thereafter, a barrel fastener 246 traverses the upper barrel aperture 242, the frame barrel aperture 240 and the lower barrel aperture 244. The barrel fastener 246 may include a pin, screw or other removable fasteners.

Figure 7:
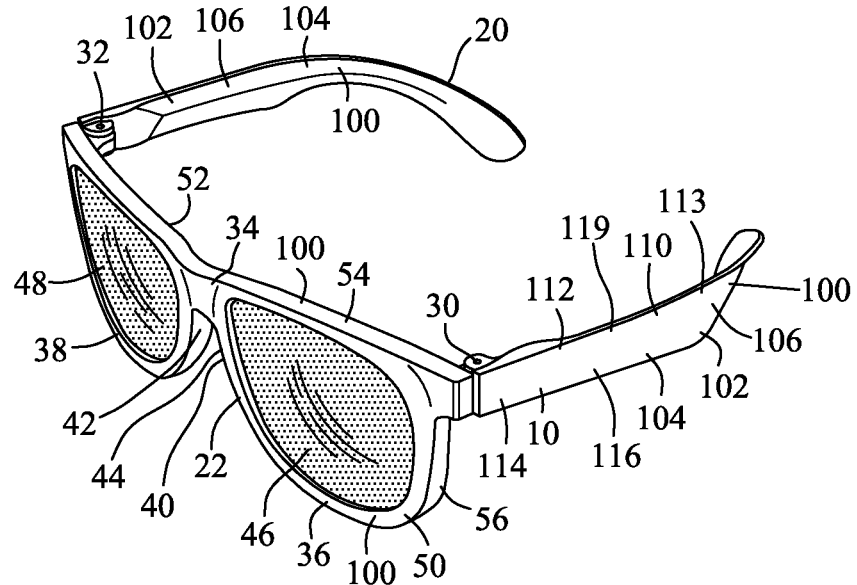
FIG. 7 is a view similar to FIG. 1 illustrating the eyewear having a removable layer that has not been selectively removed.
Figure 8:
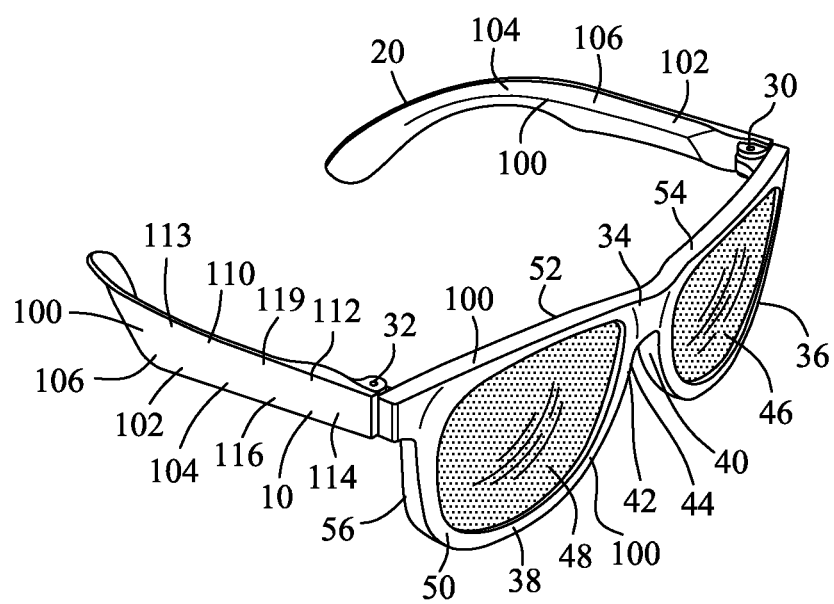
FIG. 8 is a view similar to FIG. 2 illustrating the eyewear having the removable layer that has not been selectively removed.

The subject invention further includes the method for creating an eyewear 20 with a decorative image 80. FIGS. 7-18 illustrate the method for creating an eyewear 20 with a decorative image 80. FIGS. 7-8 illustrate the step of coating an eyewear 20 with a scratch off layer 100. FIGS. 9-14 illustrate the step of removing a selected portion of the scratch off layer 100 for defining a visual image 80 with an eyewear pigment 70 of the eyewear 20 relative to a layer pigment 104 of the scratch off layer 100.

Figure 9:
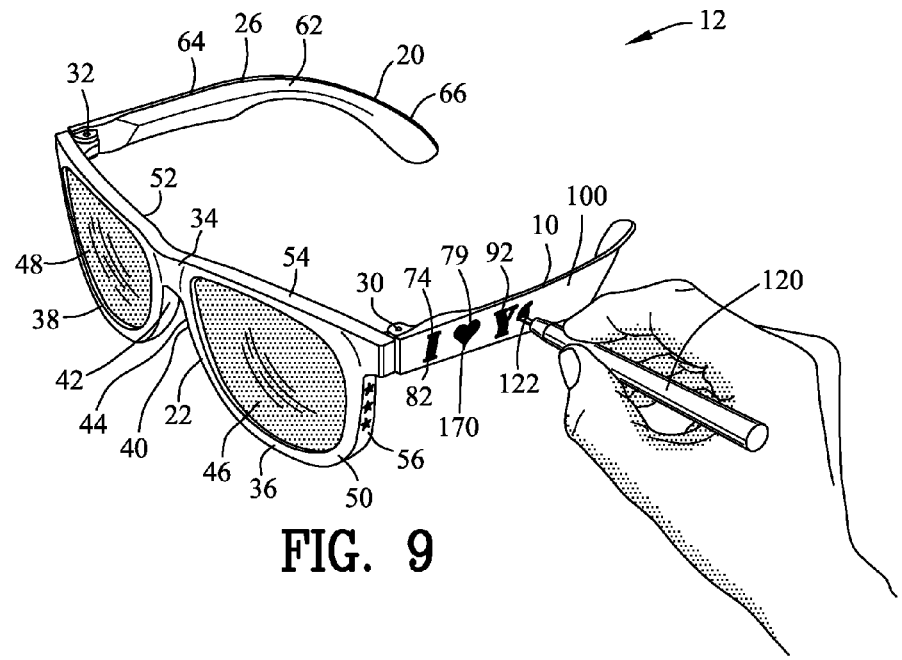
FIG. 9 is a view similar to FIG. 7 illustrating the removable layer being removed from the eyewear for creating a visual image on an exterior side of a primary temple arm.
Figure 10:
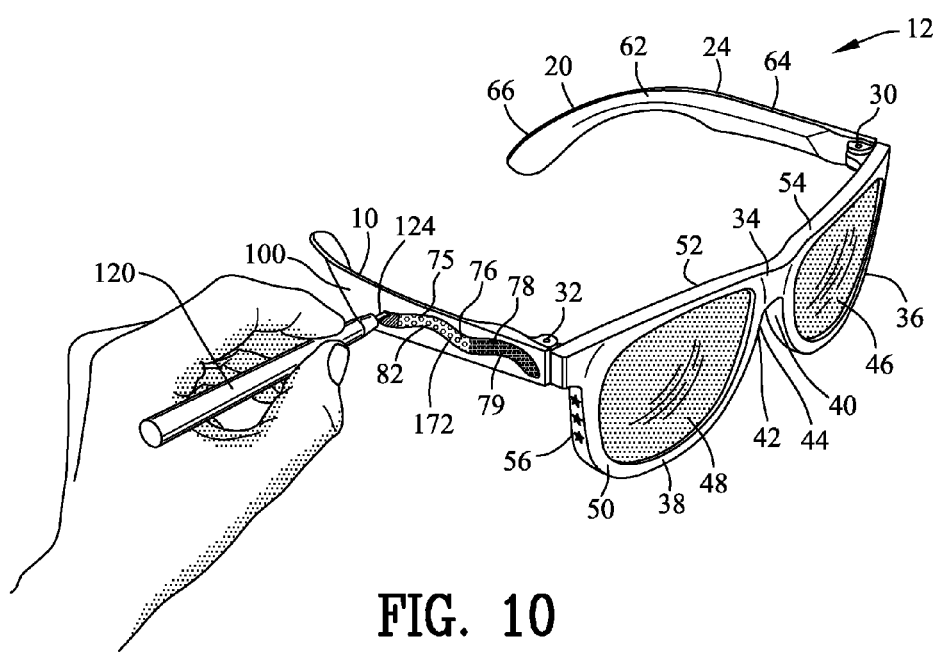
FIG. 10 is a view similar to FIG. 8 illustrating the removable layer being removed from the eyewear for creating a visual image on an exterior side of a secondary temple arm.
Figure 11:
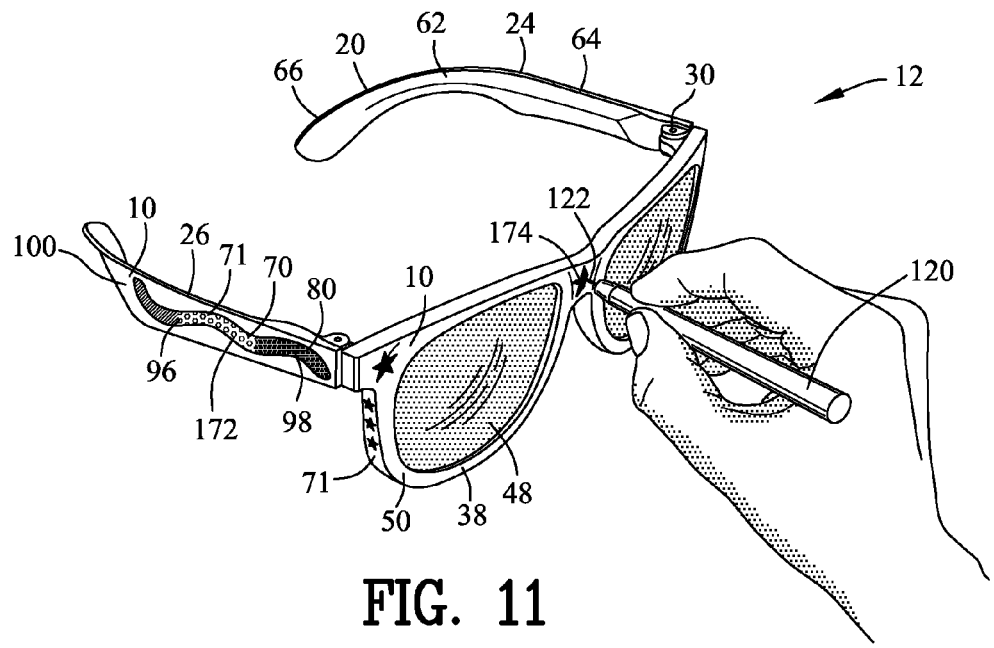
FIG. 11 is a view similar to FIG. 10 illustrating the removable layer being removed from the eyewear for creating a visual image on a front side of the eyewear.
Figure 12:
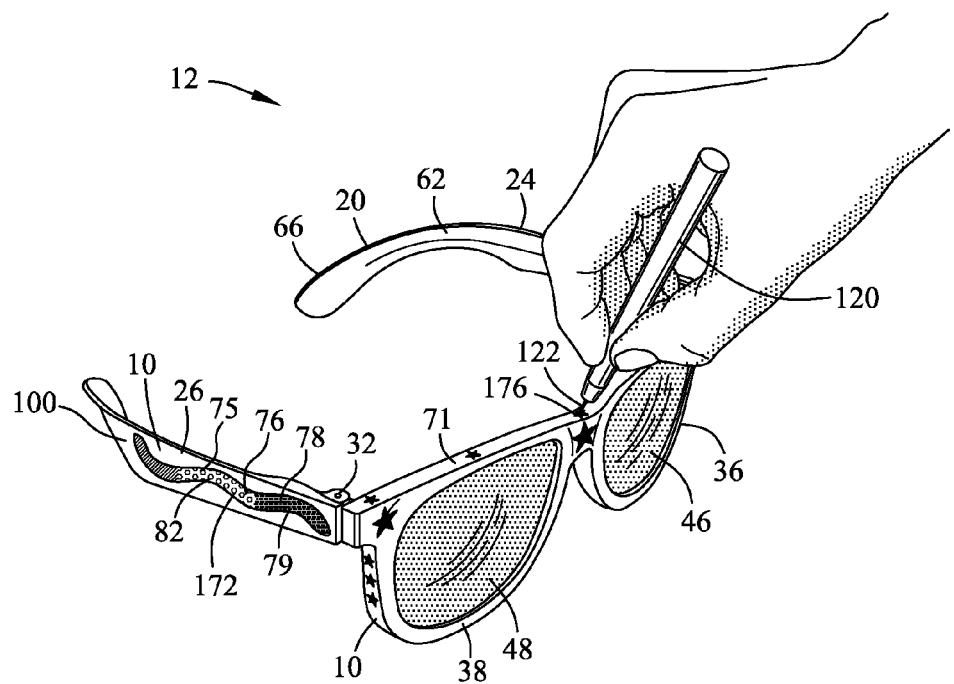
FIG. 12 is a view similar to FIG. 11 illustrating the removable layer being removed from the eyewear for creating a visual image on an upper side of the eyewear.

As shown in FIG. 9, the step of removing a selected portion of the scratch off layer 100 includes removing a first selected portion of the scratch off layer 100 on the exterior side 60 of a primary temple arm 24 for creating a primary visual image 170. As shown in FIG. 10, the step of removing a second selected portion of the scratch off layer 100 on the exterior side 60 of a secondary temple arm 26 for creating a secondary visual image 172. As shown in FIG. 11, the step of removing a selected portion of the scratch off layer 100 includes removing a third selected portion of the scratch off layer 100 on the front side 50 of the frame 22 for creating a third visual image 174. As shown in FIG. 12, the step of removing a fourth selected portion of the scratch off layer 100 on the upper side 54 of the frame 22 for creating a fourth visual image 176. As shown in FIG. 13, the step of removing a fifth selected portion of the scratch off layer 100 on the interior side 62 of a secondary temple arm 26 for creating a fifth visual image 178. As shown in FIG. 14, the step of removing a selected portion of the scratch off layer 100 includes removing a sixth selected portion of the scratch off layer 100 on the interior side 60 of a primary temple arm 24 for creating a sixth image 180.

Figure 15:
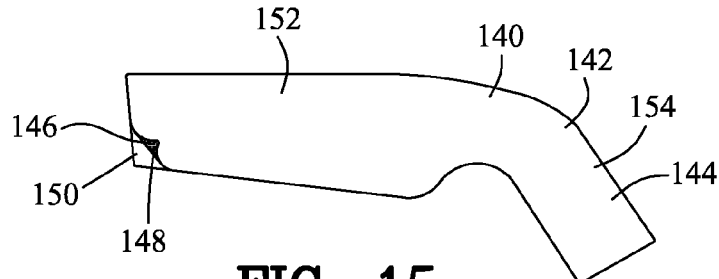
FIG. 15 is a side view of a top view of a transparent protective layer.
Figure 17:
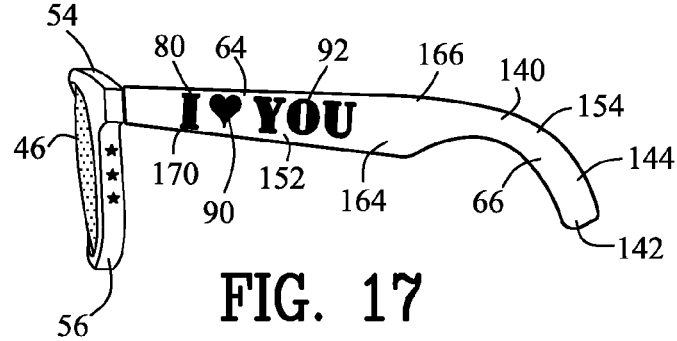
FIG. 17 is a view similar to FIG. 16 illustrating an upper over paying layer portion in a lower overhang player portion being positioned adjacent to the interior side of the primary temple arm.
Figure 18:
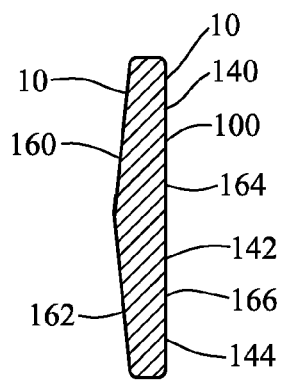
FIG. 18 is a sectional view along line 18-18 in FIG. 17.

FIGS. 15-18 illustrate the step of applying a protective layer 140 over the visual image 80 for preventing the scratch off layer 100 from additional inadvertent removal of the scratch off layer 100 from the eyewear 20. FIG. 15 illustrates the step of removing the adhesive cover sheet 150 from the protective layer 140. FIG. 16 illustrates the step of partially adhering the protective layer 140 to the exterior side 60 of the primary temple arm 24 for protecting the scratch off layer 100 from additional inadvertent removal of the scratch off layer 100 from the exterior side 60 of the primary temple arm 24. FIG. 17 illustrates the step of the upper overhang portion 160 and the lower overhang portion 162 being folded over to make contact with the interior side 62 of the primary temple arm 24 for protecting any additional visual image 80 that may be located on the interior side 62 of the primary temple arm 24.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A removable layer covering an eyewear, the eyewear having a frame, a primary temple arm and a secondary temple arm, the frame having a front side, a rear side, an upper side and a lower side, the primary temple arm and the secondary temple arm having an exterior side and an interior side, the eyewear having an eyewear pigment, the removable layer comprising:
    a scratch off layer covering the eyewear;
    said scratch off layer having a layer pigment; and
    said scratch off layer selectively removed from the eyewear for defining a visual image with the eyewear pigment relative to said layer pigment.

2. A removable layer covering an eyewear as set forth in claim 1, wherein said the visual image selected from the group consisting of a letter, a number, a design, a symbol and a message.

3. A removable layer covering an eyewear as set forth in claim 1, wherein said scratch off layer covers the exterior side of the primary temple arm; and
    said visual image positioned on the exterior side of the primary temple arm.

4. A removable layer covering an eyewear as set forth in claim 1, wherein said scratch off layer covers the exterior side of the secondary temple arm; and
    said visual image positioned on the exterior side of the secondary temple arm.

5. A removable layer covering an eyewear as set forth in claim 1, wherein said scratch off layer covers the interior side of the primary temple arm; and
    said visual image positioned on the interior side of the primary temple arm.

6. A removable layer covering an eyewear as set forth in claim 1, wherein said scratch off layer covers the interior side of the secondary temple arm; and
    said visual image positioned on the interior side of the secondary temple arm.

7. A removable layer covering an eyewear as set forth in claim 1, wherein said scratch off layer covers the front side of the frame; and
    said visual image positioned on the front side of the frame.

8. A removable layer covering an eyewear as set forth in claim 1, wherein said scratch off layer includes an opaque latex substance for permitting the selective removal of said scratch off layer and resisting the removal of said scratch off layer from normal abrasion.

9. A removable layer covering an eyewear as set forth in claim 1, further including a protective layer covering said visual image for protecting said scratch off layer from additional inadvertent removal of said scratch off layer from the eyewear.

10. A removable layer covering an eyewear as set forth in claim 9, wherein said protective layer includes a transparent material for permitting the viewing of said visual image.

11. A removable layer covering an eyewear as set forth in claim 9, further including an adhesive layer coupled to said protective layer for binding said protective layer with the eyewear.

12. An eyewear with a decorative feature, comprising:
    an eyewear including a frame, a primary temple arm and a secondary temple arm;

said frame having a front side, a rear side, an upper side and a lower side;

said primary temple arm and said secondary temple arm having an exterior side and an interior side;

said eyewear having an eyewear pigment;

a scratch off layer covering said eyewear;

said scratch off layer having a layer pigment; and said scratch off layer selectively removed from said eyewear for defining a visual image with said eyewear pigment relative to said layer pigment.

13. A removable layer covering an eyewear as set forth in claim 12, wherein said the visual image selected from the group consisting of a letter, a number, a design, a symbol and a message.

14. An eyewear with a decorative feature as set forth in claim 12, wherein said scratch off layer includes an opaque latex substance for permitting the selective removal of said scratch off layer and resisting the removal of said scratch off layer from normal abrasion.

15. An eyewear with a decorative feature as set forth in claim 12, wherein said eyewear includes a decorative surface selected from the group consisting of a pigment, multiple pigments, pattern, texture and hologram for defining a second visual image with said eyewear pigment relative to said layer pigment.

16. An eyewear with a decorative feature as set forth in claim 12, further including a transparent protective layer covering said visual image for protecting said scratch off layer from additional inadvertent removal of said scratch off layer from the eyewear.

17. An eyewear with a decorative feature as set forth in claim 16, wherein said transparent protective layer includes any removable encapsulating shield;

said removable encapsulating shield including an exterior shield side, and upper shield side, a lower shield side, a primary interior shield side and a secondary interior shield side for defining a shield channel;

a first removable encapsulating shield encapsulating said primary temple arm; and a second removable encapsulating shield encapsulating said secondary temple arm.

18. An eyewear with a decorative feature as set forth in claim 12, further including a first disengaging pivot for separating said primary temple arm from said frame;

a second disengaging pivot for separating said secondary temple arm from said frame;

said first disengaging pivot permitting the engagement of an alternative primary temple arm including a first altering visual image and a six altering visual image; and said second disengaging pivot permitting the engagement of an alternative secondary temple arm including a second altering visual image and a fifth altering visual image.

19. The method for creating an eyewear with a decorative image, the method comprising the steps of:

coating an eyewear with a scratch off layer; and removing a selected portion of said scratch off layer for defining a visual image with an eyewear pigment of said eyewear relative to a layer pigment of said scratch off layer.

20. The method for creating an eyewear with a decorative feature as set forth in claim 19, wherein the step of removing a selected portion of said scratch off layer includes removing a first selected portion of said scratch off layer on an exterior side of a primary temple arm for creating a primary visual image; and removing a second selected portion of said scratch off layer on an exterior side of a secondary temple arm for creating a secondary visual image.

21. The method for creating an eyewear with a decorative feature as set forth in claim 19, further including the step of applying a protective layer over said visual image for preventing said scratch off layer from additional inadvertent removal of said scratch off layer from said eyewear.

22. A removable layer for an eyewear, the eyewear having a frame, a primary temple arm and a secondary temple arm, the primary temple arm and the secondary temple arm having an exterior side and an interior side, the eyewear having an eyewear pigment, the removable layer comprising:

a scratch off layer covering the exterior side of the primary temple arm;

said scratch off layer having a layer pigment; and said scratch off layer selectively removed from the exterior side of the primary temple arm for defining a visual image with the eyewear pigment relative to said layer pigment.

23. A removable layer for an eyewear, the eyewear having a frame, a primary temple arm and a secondary temple arm, the primary temple arm and the secondary temple arm having an exterior side and an interior side, the eyewear having an eyewear pigment, the removable layer comprising:

a scratch off layer covering the exterior side of the secondary temple arm;

said scratch off layer having a layer pigment; and said scratch off layer selectively removed from the exterior side of the secondary temple arm for defining a visual image with the eyewear pigment relative to said layer pigment.

24. A removable layer for an eyewear, the eyewear having a frame, a primary temple arm and a secondary temple arm, the frame having a front side, a rear side, an upper side and a lower side, the primary temple arm and the secondary temple arm having an exterior side and an interior side, the eyewear having an eyewear pigment, the removable layer comprising:

a scratch off layer covering the front side of the frame;

said scratch off layer having a layer pigment; and said scratch off layer selectively removed from the front side of the frame for defining a visual image with the eyewear pigment relative to said layer pigment.

* * * * *